(12) United States Patent
Liu et al.

(10) Patent No.: US 11,593,964 B2
(45) Date of Patent: *Feb. 28, 2023

(54) METHODS AND APPARATUSES FOR OUTPUTTING INFORMATION AND CALIBRATING CAMERA

(71) Applicant: BEIJING BAIDU NETCOM SCIENCE AND TECHNOLOGY CO., LTD., Beijing (CN)

(72) Inventors: Xiang Liu, Beijing (CN); Shuang Zhang, Beijing (CN); Bin Gao, Beijing (CN); Xiaoxing Zhu, Beijing (CN); Fan Yang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 19 days.

This patent is subject to a terminal disclaimer.

(21) Appl. No.: 17/327,052

(22) Filed: May 21, 2021

(65) Prior Publication Data

US 2021/0272319 A1 Sep. 2, 2021

Related U.S. Application Data

(62) Division of application No. 16/912,360, filed on Jun. 25, 2020, now Pat. No. 11,216,977.

(30) Foreign Application Priority Data

Sep. 24, 2019 (CN) .......................... 201910907183.8

(51) Int. Cl.
*G06T 7/80* (2017.01)
*G06T 5/50* (2006.01)
*H04N 17/00* (2006.01)

(52) U.S. Cl.
CPC .................. *G06T 7/80* (2017.01); *G06T 5/50* (2013.01); *H04N 17/002* (2013.01); *G06T 2200/24* (2013.01); *G06T 2207/20216* (2013.01)

(58) Field of Classification Search
CPC ......... G06T 7/80; G06T 5/50; G06T 2200/24; G06T 2207/20216; G06T 2207/10028;
(Continued)

(56) References Cited

U.S. PATENT DOCUMENTS 10,710,606 B2 7/2020 Tsujioka et al.
10,933,751 B2 3/2021 Masui et al.
(Continued)

FOREIGN PATENT DOCUMENTS

JP 2002-274305 A 9/2002
JP 2007-225628 A 9/2007
(Continued)

*Primary Examiner* — Michael E Teitelbaum
(74) *Attorney, Agent, or Firm* — Seed IP Law Group LLP

(57) ABSTRACT

Embodiments of the present disclosure relate to methods and apparatuses for outputting information and calibrating a camera. The method may include: acquiring a first image, a second image, and a third image, the first image being an image photographed by a to-be-calibrated camera, the second image being a high-precision map image including a target area indicated by the first image, and the third image being a reflectance image including the target area; fusing the second image and the third image to obtain a fused image; determining a matching point pair based on points selected by a user in the first image and the fused image; and calibrating the to-be-calibrated camera based on coordinates of the matching point pair.

12 Claims, 7 Drawing Sheets

(58) Field of Classification Search
CPC ............ G06T 7/73; G06T 2207/20221; H04N 17/002
See application file for complete search history.

(56) References Cited

U.S. PATENT DOCUMENTS

| | | |
|---|---|---|
| 2009/0085910 A1 | 4/2009 | Elsberg et al. |
| 2012/0119879 A1 | 5/2012 | Estes et al. |
| 2013/0222599 A1 | 8/2013 | Shaw |
| 2018/0150994 A1 | 5/2018 | Foutzitzis et al. |
| 2019/0271559 A1 | 9/2019 | Colgate et al. |
| 2020/0318975 A1 | 10/2020 | Yoshida |
| 2021/0061194 A1 | 3/2021 | Sugawa et al. |

FOREIGN PATENT DOCUMENTS

| | | |
|---|---|---|
| JP | 2008-203940 A | 9/2008 |
| JP | 2011-018094 A | 1/2011 |
| JP | 2017-090420 A | 5/2017 |
| JP | 2017-097770 A | 6/2017 |
| JP | 2018-504309 A | 2/2018 |
| JP | 2018-518412 A | 7/2018 |
| JP | 2018-148422 A | 9/2018 |
| JP | 2018-196252 A | 12/2018 |
| JP | 2019-077414 A | 5/2019 |
| JP | 2019-083450 A | 5/2019 |
| JP | 2019-134301 A | 8/2019 |
| WO | 2018/230132 A1 | 12/2018 |

METHODS AND APPARATUSES FOR OUTPUTTING INFORMATION AND CALIBRATING CAMERA

CROSS-REFERENCE TO RELATED APPLICATIONS

This application is a divisional application of U.S. patent application Ser. No. 16/912,360, filed on Jun. 25, 2020, which claims priority to Chinese Application No. 201910907183.8, filed on Sep. 24, 2019 and entitled "Methods and Apparatuses for Outputting Information and Calibrating Camera," the entire disclosure of which is hereby incorporated by reference.

TECHNICAL FIELD

Embodiments of the present disclosure relate to the field of computer technology, and specifically to methods and apparatuses for outputting information and calibrating a camera.

BACKGROUND

Camera calibration is one of the key research topics in the fields, such as photogrammetry, visual detection, and computer vision, and has been very widely used in the fields, such as surveying and mapping, industrial control, navigation, and military. Camera calibration provides a quantitative relationship for correspondence and conversion between two-dimensional information of a visual image and a practical three-dimensional object world.

SUMMARY

Embodiments of the present disclosure propose methods and apparatuses for outputting information and calibrating a camera.

In a first aspect, an embodiment of the present disclosure provides a method for outputting information, including: displaying, in response to a first image input operation of a user, a first image selected by the user, the first image being an image photographed by a to-be-calibrated camera; fusing, in response to a second image input operation of the user, a second image and a third image selected by the user, and displaying an obtained fused image, the second image being a high-precision map image including a target area indicated by the first image, and the third image being a reflectance image including the target area; displaying, in response to a point selection operation of the user on the first image and/or the fused image, a point selected by the user in the first image and/or the fused image; and outputting coordinates of the selected point.

In some embodiments, the fusing a second image and a third image selected by the user includes: fusing the second image and the third image based on coordinates of a pixel point in the high-precision map image and coordinates of a pixel point in the reflectance image.

In some embodiments, the point selection operation includes a first point selection operation for the first image and a second point selection operation for the fused image; and the displaying, in response to a point selection operation of the user on the first image and/or the fused image, a point selected by the user in the first image and/or the fused image includes: using, in response to the first point selection operation and the second point selection operation after the first point selection operation, a first point indicated by the first point selection operation and a second point indicated by the second point selection operation as a matching point pair; and displaying the matching point pair in association on the first image and the fused image.

In some embodiments, the method further includes: adding, in response to an adding operation for the matching point pair, the matching point pair to a preset matching point pair set; and storing, in response to a storage operation for the matching point pair set, the matching point pair set locally.

In some embodiments, the point selection operation includes a third point selection operation and a fourth point selection operation for the first image or the fused image; and the displaying, in response to a point selection operation of the user on the first image and/or the fused image, a point selected by the user in the first image and/or the fused image includes: using, in response to the third point selection operation, a third point indicated by the third point selection operation as a starting point of an auxiliary line; using, in response to the fourth point selection operation, a fourth point indicated by the fourth point selection operation as an ending point of the auxiliary line; connecting, in response to a line drawing operation for the starting point and the ending point, the starting point and the ending point; and displaying the starting point, the ending point, and a straight line obtained by the connecting the starting point and the ending point in the first image or the fused image.

In some embodiments, the method further includes: no longer displaying, in response to a cancel operation of the user on the selected point, the selected point on which the cancel operation is performed.

In a second aspect, an embodiment of the present disclosure provides a method for calibrating a camera, including: acquiring a first image, a second image, and a third image, the first image being an image photographed by a to-be-calibrated camera, the second image being a high-precision map image including a target area indicated by the first image, and the third image being a reflectance image including the target area; fusing the second image and the third image to obtain a fused image; determining a matching point pair based on points selected by a user in the first image and the fused image; and calibrating the to-be-calibrated camera based on coordinates of the matching point pair.

In some embodiments, the fusing the second image and the third image to obtain a fused image includes: fusing the second image and the third image based on coordinates of a pixel point in the high-precision map image and coordinates of a pixel point in the reflectance image.

In some embodiments, the determining a matching point pair based on points selected by a user in the first image and the fused image includes: determining a first point selected by the user in the first image and a second point selected in the fused image after the first point is selected; and using the first point and the second point as the matching point pair.

In some embodiments, the method further includes: adding the matching point pair to a preset matching point pair set; and storing the matching point pair set locally.

In a third aspect, an embodiment of the present disclosure provides an apparatus for outputting information, including: a first displaying unit configured to display, in response to a first image input operation of a user, a first image selected by the user, the first image being an image photographed by a to-be-calibrated camera; a second displaying unit configured to fuse, in response to a second image input operation of the user, a second image and a third image selected by the user, and display an obtained fused image, the second image being a high-precision map image including a target area indicated by the first image, and the third image being a reflectance image including the target area; a point selecting unit configured to display, in response to a point selection operation of the user on the first image and/or the fused image, a point selected by the user in the first image and/or the fused image; and an outputting unit configured to output coordinates of the selected point.

In some embodiments, the second displaying unit is further configured to: fuse the second image and the third image based on coordinates of a pixel point in the high-precision map image and coordinates of a pixel point in the reflectance image.

In some embodiments, the point selection operation includes a first point selection operation for the first image and a second point selection operation for the fused image; and the second displaying unit is further configured to: use, in response to the first point selection operation and the second point selection operation after the first point selection operation, a first point indicated by the first point selection operation and a second point indicated by the second point selection operation as a matching point pair; and display the matching point pair in association on the first image and the fused image.

In some embodiments, the apparatus further includes: an adding unit configured to add, in response to an adding operation for the matching point pair, the matching point pair to a preset matching point pair set; and a storing unit configured to store, in response to a storage operation for the matching point pair set, the matching point pair set locally.

In some embodiments, the point selection operation includes a third point selection operation and a fourth point selection operation for the first image or the fused image; and the second displaying unit is further configured to: use, in response to the third point selection operation, a third point indicated by the third point selection operation as a starting point of an auxiliary line; use, in response to the fourth point selection operation, a fourth point indicated by the fourth point selection operation as an ending point of the auxiliary line; connect, in response to a line drawing operation for the starting point and the ending point, the starting point and the ending point; and display the starting point, the ending point, and a straight line obtained by the connecting the starting point and the ending point in the first image or the fused image.

In some embodiments, the apparatus further includes: a cancelling unit configured to no longer display, in response to a cancel operation of the user on the selected point, the selected point on which the cancel operation is performed.

In a fourth aspect, an embodiment of the present disclosure provides an apparatus for calibrating a camera, including: an acquiring unit configured to acquire a first image, a second image, and a third image, the first image being an image photographed by a to-be-calibrated camera, the second image being a high-precision map image including a target area indicated by the first image, and the third image being a reflectance image including the target area; a fusing unit configured to fuse the second image and the third image to obtain a fused image; a determining unit configured to determine a matching point pair based on points selected by a user in the first image and the fused image; and a calibrating unit configured to calibrate the to-be-calibrated camera based on coordinates of the matching point pair.

In some embodiments, the fusing unit is further configured to: fuse the second image and the third image based on coordinates of a pixel point in the high-precision map image and coordinates of a pixel point in the reflectance image.

In some embodiments, the determining unit is further configured to: determine a first point selected by the user in the first image and a second point selected in the fused image after the first point is selected; and use the first point and the second point as the matching point pair.

In some embodiments, the apparatus further includes: an adding unit configured to add the matching point pair to a preset matching point pair set; and a storing unit configured to store the matching point pair set locally.

In a fifth aspect, an embodiment of the present disclosure provides an electronic device, the electronic device including: one or more processors; and a storage apparatus, storing one or more programs, where the one or more programs, when executed by the one or more processors, cause the one or more processors to implement any embodiment of the method according to the first aspect.

In a sixth aspect, an embodiment of the present disclosure provides an electronic device, the electronic device including: one or more processors; and a storage apparatus, storing one or more programs, where the one or more programs, when executed by the one or more processors, cause the one or more processors to implement any embodiment of the method according to the second aspect.

In a seventh aspect, an embodiment of the present disclosure provides a computer readable medium, storing a computer program thereon, where the computer program, when executed by a processor, implements any embodiment of the method according to the first aspect.

In an eighth aspect, an embodiment of the present disclosure provides a computer readable medium, storing a computer program thereon, where the computer program, when executed by a processor, implements any embodiment of the method according to the second aspect.

The methods and apparatuses for outputting information and calibrating a camera provided by embodiments of the present disclosure can support a user to perform a point selection operation on the first image photographed by the to-be-calibrated camera and the fused image, and output the coordinates of the selected point, for further camera calibration. The methods of the present embodiment are convenient for the user to select paired points to calibrate the camera.

BRIEF DESCRIPTION OF THE DRAWINGS

After reading detailed description of non-limiting embodiments with reference to the following accompanying drawings, other features, objectives and advantages of the present disclosure will become more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
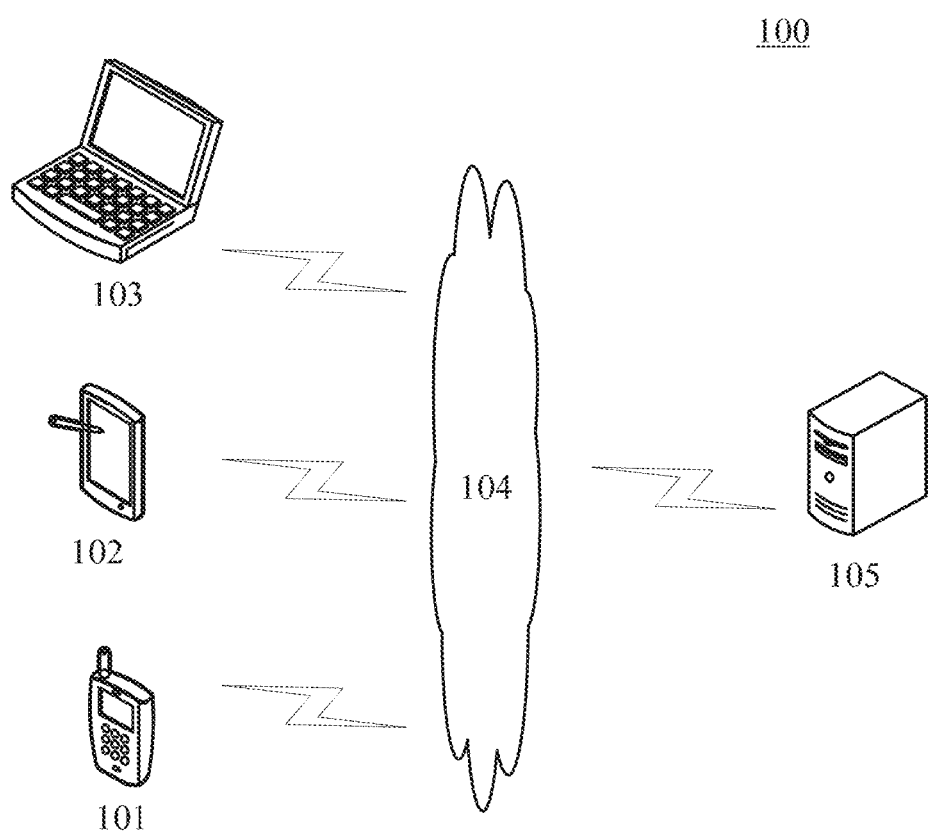
FIG. 1 is a diagram of an example system architecture in which an embodiment of the present disclosure may be implemented.

FIG. 1 shows an example system architecture 100 in which a method for outputting information, a method for calibrating a camera, an apparatus for outputting information, or an apparatus for calibrating a camera of embodiments of the present disclosure may be implemented.

As shown in FIG. 1, the system architecture 100 may include terminal devices 101, 102, and 103, a network 104, and a server 105. The network 104 serves as a medium providing a communication link between the terminal devices 101, 102, and 103, and the server 105. The network 104 may include various types of connections, such as wired or wireless communication links, or optical cables.

A user may interact with the server 105 using the terminal devices 101, 102, and 103 via the network 104, e.g., to receive or send a message. The terminal devices 101, 102, and 103 may be provided with various communication client applications, such as an image browsing application, an image processing application, a web browser application, an instant messaging tool, an email client, and social platform software.

The terminal devices 101, 102, and 103 may be hardware, or may be software. When the terminal devices 101, 102, and 103 are hardware, the terminal devices may be various electronic devices having display screens and supporting image processing, including but not limited to smart phones, tablet computers, laptop portable computers, desktop computers, and the like. When the terminal devices 101, 102, and 103 are software, the terminal devices may be installed in the above-listed electronic devices, or may be implemented as a plurality of software programs or software modules (e.g., software programs or software modules for providing distributed services), or may be implemented as a single software program or software module. This is not specifically limited here.

The server 105 may be a server providing various services, such as a back-end image server providing support for images displayed on the terminal devices 101, 102, and 103. The back-end image server can process, e.g., analyze, received data, such as an image.

It should be noted that the server 105 may be hardware, or may be software. When the server 105 is hardware, the server may be implemented as a distributed server cluster composed of a plurality of servers, or may be implemented as a single server. When the server 105 is software, the server may be implemented as a plurality of software programs or software modules (e.g., software programs or software modules for providing distributed services), or may be implemented as a single software program or software module. This is not specifically limited here.

It should be noted that the method for outputting information provided by some embodiments of the present disclosure is generally executed by the terminal devices 101, 102, and 103; and the method for calibrating a camera may be executed by the terminal devices 101, 102, and 103, or may be executed by the server 105. Accordingly, the apparatus for outputting information is generally provided in the terminal devices 101, 102, and 103; and the apparatus for calibrating a camera may be provided in the terminal devices 101, 102, and 103, or may be provided in the server 105.

It should be understood that the numbers of terminal devices, networks, and servers in FIG. 1 are merely illustrative. Any number of terminal devices, networks, and servers may be provided based on actual requirements.

Figure 2:
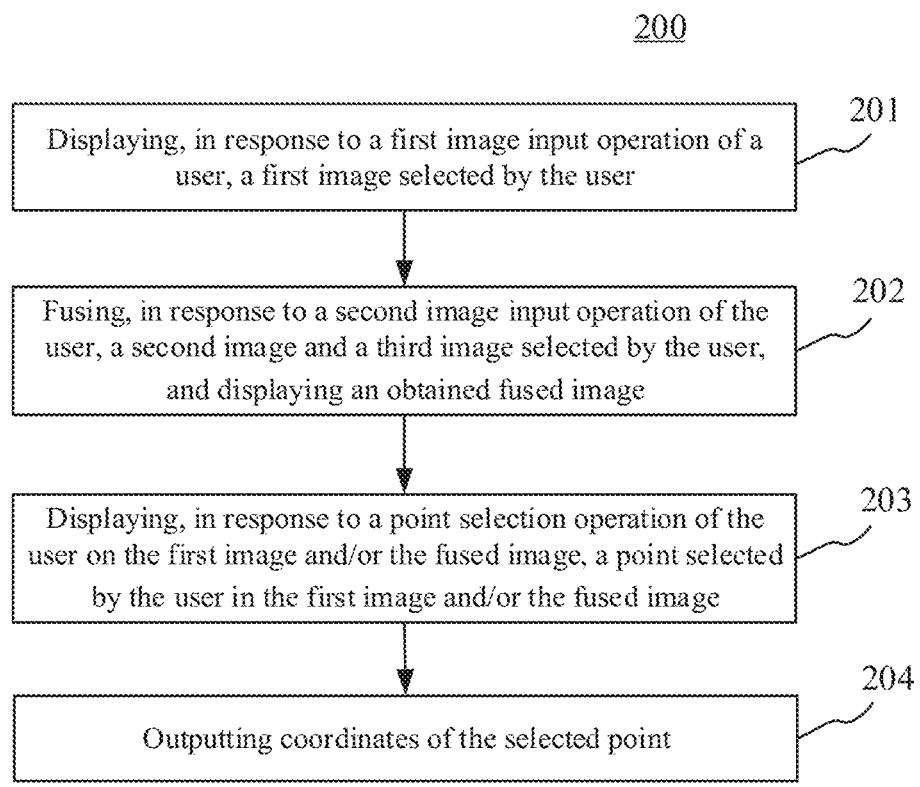
FIG. 2 is a flowchart of a method for outputting information according to an embodiment of the present disclosure.

With further reference to FIG. 2, a process 200 of a method for outputting information according to an embodiment of the present disclosure is shown. The method for outputting information includes following steps.

Step 201: displaying, in response to a first image input operation of a user, a first image selected by the user.

In the present embodiment, an executing body (e.g., the terminal devices 101, 102, and 103 shown in FIG. 1) of the method for outputting information may detect an operation of the user. If the first image input operation of the user is detected, then the first image selected by the user can be displayed. Specifically, a calibration tool may be installed in the executing body, and the calibration tool may include a first image input button. The user can perform the first image input operation by clicking the first image input button or using a preset shortcut key. The executing body can display an image input window after detecting the first image input operation, such that the user selects the first image to be inputted into the calibration tool. The calibration tool may further include a display window, and the executing body can display the first image in the display window.

In the present embodiment, the first image is an image photographed by a to-be-calibrated camera. The to-be-calibrated camera may be fixed at a certain position of a road or an intersection, and is used for photographing a road surface image.

Step 202: fusing, in response to a second image input operation of the user, a second image and a third image selected by the user, and displaying an obtained fused image.

The executing body can further detect the second image input operation of the user, fuse the second image and the third image selected by the user upon detecting the second image input operation, to obtain the fused image, and display the fused image. Specifically, the calibration tool may include a second image input button. The user can perform the second image input operation by clicking the second image input button or using a preset shortcut key. The executing body can display the image input window after detecting the second image input operation, such that the user selects the to-be-fused second image and third image.

In the present embodiment, the second image is a high-precision map image including a target area indicated by the first image, and the third image is a reflectance image including the target area. Here, the high-precision map has more abundant map information than ordinary maps, such as lane lines, lane boundaries, zebra crossings, stop lines, traffic lights, and traffic signs, as well as height, slope distance, and other information. The reflectance image refers to an image obtained by projecting point cloud data to the ground. The point cloud data include building information, road information, and the like. It can be understood that both the high-precision map image and the reflectance image have coordinate information.

The executing body may fuse the high-precision map image and the reflectance image based on coordinate information therein, or may fuse the high-precision map image and the reflectance image based on road information therein. Here, the fusing the high-precision map image and the reflectance image may refer to image processing on the high-precision map image and the reflectance image, such that the obtained fused image displays information included in both the high-precision map image and the reflectance image. Thus, the user can conveniently select a point in the fused image.

In some alternative implementations of the present embodiment, the executing body may fuse the second image and the third image through the following step that is not shown in FIG. 2: fusing the second image and the third image based on coordinates of a pixel point in the high-precision map image and coordinates of a pixel point in the reflectance image.

In the present implementation, the executing body may determine, based on the coordinates of the pixel point in the high-precision map image, the pixel point in the reflectance image having the same coordinates as the coordinates of the pixel point in the high-precision map image. The fused image can be obtained by aligning the pixel points of the same coordinates.

In some alternative implementations of the present embodiment, a window displaying the first image and a window displaying the fused image may be arranged left and right, or may be arranged up and down. Thus, the user can compare the first image and the fused image more conveniently, thereby conveniently selecting paired points.

Step 203: displaying, in response to a point selection operation of the user on the first image and/or the fused image, a point selected by the user in the first image and/or the fused image.

The user may perform the point selection operation on the displayed first image and/or the fused image. Specifically, the user may perform the point selection operation by clicking a button in the calibration tool or using a shortcut key. The user may select a point only in the first image or the fused image, or may select a point in the first image, and then select a point in the fused image. In the present embodiment, the executing body may display the point selected by the user in the first image and/or the fused image. It can be understood that if the user selects a point in the first image, then the selected point can be displayed only in the first image. Similarly, if the user selects a point only in the fused image, then the selected point can be displayed only in the fused image.

Step 204: outputting coordinates of the selected point.

On completion of the point selection operation, the executing body can output the coordinates of the selected point. Specifically, for the point selected by the user in the first image, the executing body can output coordinates of the selected point in the first image. For the point selected by the user in the fused image, the executing body can output projection coordinates of the selected point in the fused image, or can output three-dimensional coordinates of the selected point. That is, for the point selected in the fused image, the executing body may or may not output height information of the point.

In the present embodiment, the executing body may output the coordinates of the selected point to a server, such that the server calibrates the to-be-calibrated camera. Alternatively, the coordinates of the selected point may also be outputted to a calibration algorithm running locally, to calibrate the to-be-calibrated camera.

The method for outputting information provided by embodiments of the present disclosure may allow the user to more conveniently select the paired points, thus facilitating calibrating the camera.

In some alternative implementations of the present embodiment, the point selection operation includes a first point selection operation for the first image and a second point selection operation for the fused image. The above step 203 may specifically include the following steps that are not shown in FIG. 2: using, in response to the first point selection operation and a second point selection operation after the first point selection operation, a first point indicated by the first point selection operation and a second point indicated by the second point selection operation as a matching point pair; and displaying the matching point pair in association on the first image and the fused image.

If the executing body detects the first point selection operation, and detects the second point selection after the first point selection operation, then the executing body may use the first point indicated by the first point selection operation and the second point indicated by the second point selection operation as the matching point pair. That is, if the user completes selecting the first point on the first image, and then continues to complete selecting the second point on the fused image, then the executing body may use the first point and the second point as the matching point pair. The executing body can further display the matching point pair in association on the first image and the fused image. Here, the displaying the matching point pair in association may refer to displaying the matching point pair in the same color, or may refer to displaying the matching point pair using the same identifier.

In some alternative implementations of the present embodiment, the method may further include the following steps that not shown in FIG. 2: adding, in response to an adding operation for the matching point pair, the matching point pair to a preset matching point pair set; and storing, in response to a storage operation for the matching point pair set, the matching point pair set locally.

In the present implementation, the user can further perform the adding operation on the matching point pair. The user can perform the adding operation via an adding button in the calibration tool or a shortcut key. After detecting the adding operation, the executing body may add the matching point pair to the preset matching point pair set. It can be understood that, when the number of matching point pairs in the matching point pair set is enough, the executing body can calibrate the to-be-calibrated camera using each matching point pair.

The executing body can further detect whether the user performs a storage operation for the matching point pair set. The user can perform the storage operation via a storage button in the calibration tool or a shortcut key. After detecting the storage operation, the executing body may store the matching point pair set locally.

In some alternative implementations of the present embodiment, the point selection operation may further include a third point selection operation and a fourth point selection operation for the first image or the fused image. Then, the executing body may also implement the step 203 through the following steps that are not shown in FIG. 2: using, in response to the third point selection operation, a third point indicated by the third point selection operation as a starting point of an auxiliary line; using, in response to the fourth point selection operation, a fourth point indicated by the fourth point selection operation as an ending point of the auxiliary line; connecting, in response to a line drawing operation for the starting point and the ending point, the starting point and the ending point; and displaying the starting point, the ending point, and a straight line obtained by the connecting the starting point and the ending point in the first image or the fused image.

In the present implementation, the user may further select two points in the first image or the fused image, and connect the two selected points, to obtain the straight line. In practical application, there may be illegibleness in the first image or the fused image, and the user may determine a point to be practically selected by drawing an auxiliary line. Specifically, the executing body may use the third point indicated by the third point selection operation as the starting point of the auxiliary line, and use the fourth point indicated by the fourth point selection operation as the ending point of the auxiliary line; connect the starting point and the ending point after detecting the line drawing operation for the starting point and the ending point; and display the straight line obtained by the connecting the starting point and the ending point in the first image or the fused image.

In some alternative implementations of the present embodiment, the method may further include the following step that is not shown in FIG. 2: no longer displaying, in response to a cancel operation of the user on the selected point, the selected point on which the cancel operation is performed.

In the present implementation, after the user selects a point, if the user would like to cancel the selected point, then the user can perform a cancel (delete) operation. After the executing body detects the cancel operation, the selected point on which the cancel operation is performed can be no longer displayed.

In the present embodiment, the user can further perform a zoom operation on the displayed first image and/or fused image, to facilitate selecting the point in the first image and/or the fused image.

Figure 3:
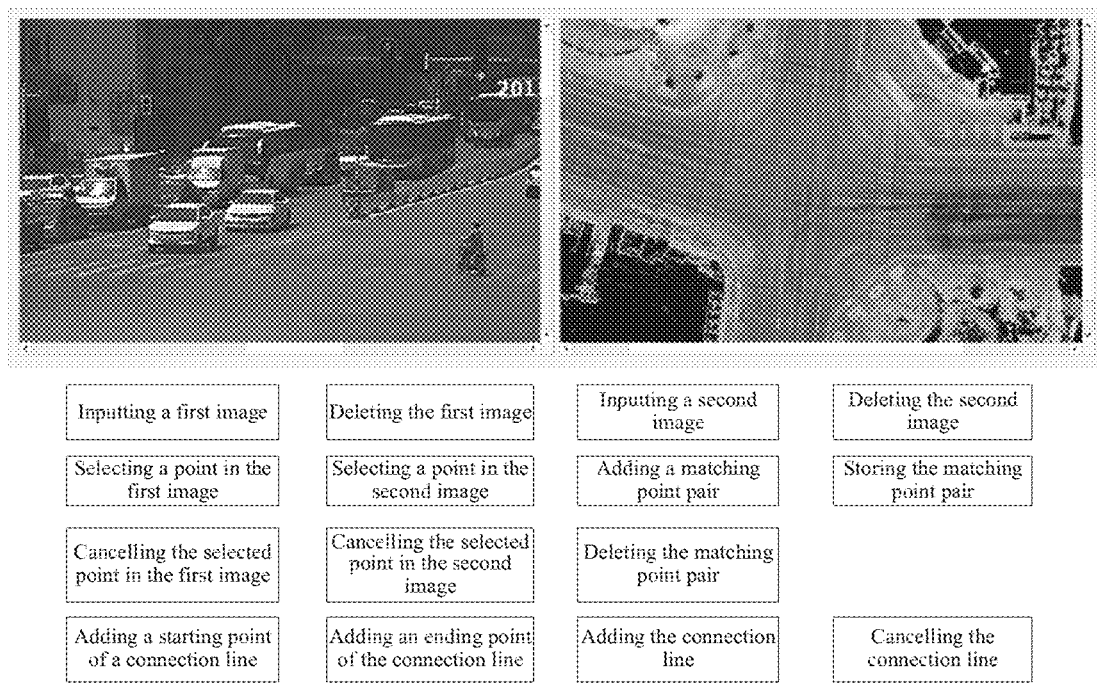
FIG. 3 is a schematic diagram of a calibration tool in the method for outputting information according to an embodiment of the present disclosure.

Referring to FIG. 3, a schematic diagram of a user interface of a calibration tool in the method for outputting information according to an embodiment of the present disclosure is shown. By using buttons on the interface, a user can perform various operations to select points in a first image (left) and a fused image (right), respectively.

Figure 4:
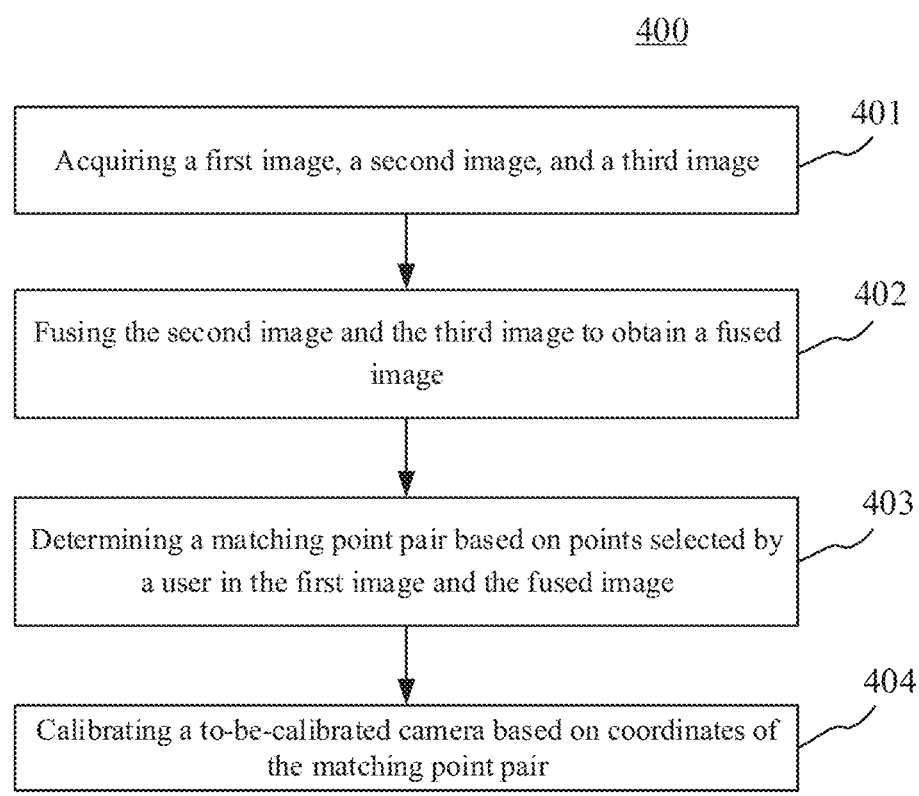
FIG. 4 is a flowchart of a method for calibrating a camera according to an embodiment of the present disclosure.

With further reference to FIG. 4, a process 400 of a method for calibrating a camera according to an embodiment of the present disclosure is shown. As shown in FIG. 4, the method for calibrating a camera according to the present embodiment may include following steps.

Step 401: acquiring a first image, a second image, and a third image.

In the present embodiment, an executing body (e.g., the terminal devices 101, 102, and 103, or the server 105 shown in FIG. 1) of the method for calibrating a camera may acquire the first image, the second image, and the third image. When the executing body is a terminal device, the executing body may acquire the first image, the second image, and the third image locally based on an operation of a user. For example, a calibration tool may be installed in the terminal device, and then the user may select the first image, the second image, and the third image locally by clicking a button in the calibration tool or using a shortcut key. When the executing body is a server, the executing body may acquire the first image, the second image, and the third image from other devices.

The first image is an image photographed by a to-be-calibrated camera. The to-be-calibrated camera may be fixed at a certain position of a road or an intersection, and is used for photographing a road surface image. The second image is a high-precision map image including a target area indicated by the first image. The third image is a reflectance image including the target area. Here, the high-precision map has more abundant map information than ordinary maps, such as lane lines, lane boundaries, zebra crossings, stop lines, traffic lights, and traffic signs, as well as height, slope distance, and other information. The reflectance image refers to an image obtained by projecting point cloud data to the ground. The point cloud data include building information, road information, and the like. It can be understood that both the high-precision map image and the reflectance image have coordinate information.

Step 402: fusing the second image and the third image to obtain a fused image.

The executing body may fuse the high-precision map image and the reflectance image based on coordinate information therein, or may fuse the high-precision map image and the reflectance image based on road information therein. Here, the fusing the high-precision map image and the reflectance image may refer to aligning the high-precision map image and the reflectance image, and the obtained fused image displays information of the high-precision map image and the reflectance image. Thus, the user can conveniently select a point in the fused image.

In some alternative implementations of the present embodiment, the executing body may fuse the second image and the third image through the following step that is not shown in FIG. 4: fusing the second image and the third image based on coordinates of a pixel point in the high-precision map image and coordinates of a pixel point in the reflectance image.

In the present implementation, the executing body may determine, based on the coordinates of the pixel point in the high-precision map image, the pixel point in the reflectance image having the same coordinates as the coordinates of the pixel point in the high-precision map image. The fused image can be obtained by superposing the pixel points of the same coordinates.

Step 403: determining a matching point pair based on points selected by a user in the first image and the fused image.

In the present embodiment, the user may select a point in the first image and a point in the fused image respectively, and the executing body may use the points selected by the user as a matching point pair. Specifically, when the executing body is a terminal device, the executing body may display the first image and the fused image on a screen, and the user may select the points in the first image and the fused image respectively through an input device of the terminal device. When the executing body is a server, the executing body may send the first image and the fused image to a terminal device used by the user. After completing selecting the points, the user sends the first image and the fused image including the selected points to the server.

In some alternative implementations of the present embodiment, the executing body may implement the above step 403 through the following steps that are not shown in FIG. 4: determining a first point selected by the user in the first image and a second point selected in the fused image after the first point is selected; and using the first point and the second point as a matching point pair.

If the executing body detects the user selecting the first point in the first image, and then detects the user selecting the second point in the fused image, then the executing body may use the first point and the second point as the matching point pair. That is, if the user completes selecting the first point in the first image, and then continues to complete selecting the second point in the fused image, then the executing body may use the first point and the second point as the matching point pair.

Step 404: calibrating a to-be-calibrated camera based on coordinates of the matching point pair.

In the present embodiment, after determining the matching point pair, the executing body may first determine the coordinates of the matching point pair. For the point selected by the user in the first image, the executing body can output coordinates of the selected point in the first image. For the point selected by the user in the fused image, the executing body can output projection coordinates of the selected point in the fused image, or can output three-dimensional coordinates of the selected point. That is, for the point selected in the fused image, the executing body may or may not output height information of the point.

In the present embodiment, coordinates of points in the fused image are coordinates in a geodetic coordinate system, and coordinates of points in the first image are coordinates in a camera coordinate system. Through an existing calibration algorithm, calibration parameters of the camera coordinate system and the geodetic coordinate system can be obtained, thereby realizing the calibration of the to-be-calibrated camera.

In some alternative implementations of the present embodiment, the method may further include the following steps that not shown in FIG. 4: adding the matching point pair to a preset matching point pair set; and storing the matching point pair set locally.

In the present implementation, the executing body may further add the matching point pair to the preset matching point pair set. The matching point pair set may be further stored in the executing body locally. Thus, when the number of matching point pairs in the matching point pair set is enough, the executing body can calibrate the to-be-calibrated camera using coordinates of each matching point pair.

The method for calibrating a camera provided by embodiments of the present disclosure can support the user to select the matching point pair using an image collected by the to-be-calibrated camera, and a high-precision map image and a reflectance image of the same area, and calibrates the camera using the matching point pair, thereby improving the calibration efficiency of manual camera calibration.

Figure 5:
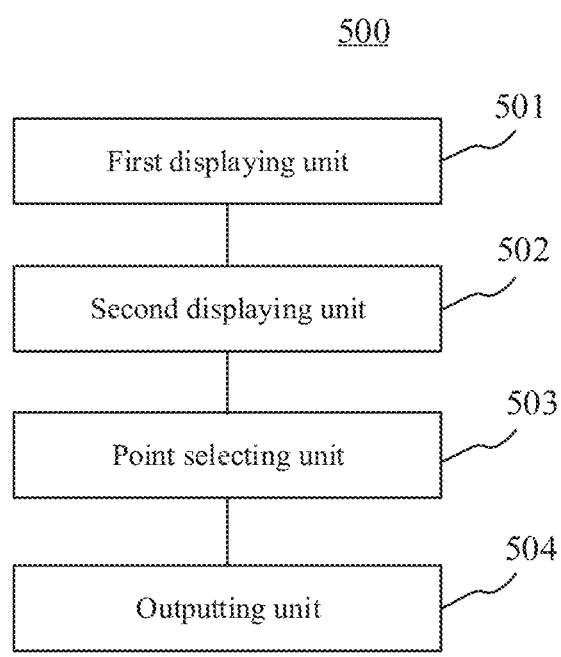
FIG. 5 is a schematic structural diagram of an apparatus for outputting information according to an embodiment of the present disclosure.

With further reference to FIG. 5, as an implementation of the method shown in the above FIG. 2, an embodiment of the present disclosure provides an apparatus for outputting information. An embodiment of the apparatus may correspond to an embodiment of the method shown in FIG. 2. The apparatus may be specifically applied to various electronic devices.

As shown in FIG. 5, the apparatus 500 for outputting information of the present embodiment includes: a first displaying unit 501, a second displaying unit 502, a point selecting unit 503, and an outputting unit 504.

The first displaying unit 501 is configured to display, in response to a first image input operation of a user, a first image selected by the user. The first image is an image photographed by a to-be-calibrated camera.

The second displaying unit 502 is configured to fuse, in response to a second image input operation of the user, a second image and a third image selected by the user, and display an obtained fused image. The second image is a high-precision map image including a target area indicated by the first image, and the third image is a reflectance image including the target area.

The point selecting unit 503 is configured to display, in response to a point selection operation of the user on the first image and/or the fused image, a point selected by the user in the first image and/or the fused image.

The outputting unit 504 is configured to output coordinates of the selected point.

In some alternative implementations of the present embodiment, the second displaying unit 502 may be further configured to: fuse the second image and the third image based on coordinates of a pixel point in the high-precision map image and coordinates of a pixel point in the reflectance image.

In some alternative implementations of the present embodiment, the point selection operation includes a first point selection operation for the first image and a second point selection operation for the fused image. The second displaying unit 502 may be further configured to: use, in response to the first point selection operation and the second point selection operation after the first point selection operation, a first point indicated by the first point selection operation and a second point indicated by the second point selection operation as a matching point pair; and display the matching point pair in association on the first image and the fused image.

In some alternative implementations of the present embodiment, the apparatus 500 may further include an adding unit and a storing unit that are not shown in FIG. 5.

The adding unit is configured to add, in response to an adding operation for the matching point pair, the matching point pair to a preset matching point pair set.

The storing unit is configured to store, in response to a storage operation for the matching point pair set, the matching point pair set locally.

In some alternative implementations of the present embodiment, the point selection operation includes a third point selection operation and a fourth point selection operation for the first image or the fused image. The second displaying unit 502 may be further configured to: use, in response to the third point selection operation, a third point indicated by the third point selection operation as a starting point of an auxiliary line; use, in response to the fourth point selection operation, a fourth point indicated by the fourth point selection operation as an ending point of the auxiliary line; connect, in response to a line drawing operation for the starting point and the ending point, the starting point and the ending point; and display the starting point, the ending point, and a straight line obtained by the connecting the starting point and the ending point in the first image or the fused image.

In some alternative implementations of the present embodiment, the apparatus 500 may further include a cancelling unit that is not shown in FIG. 5, and is configured to no longer display, in response to a cancel operation of the user on the selected point, the selected point on which the cancel operation is performed.

It should be understood that the unit 501 to unit 504 in the apparatus 500 for outputting information correspond to the steps in the method described in FIG. 2 respectively. Therefore, the operations and features described above for the method for outputting information also apply to the apparatus 500 and the units included therein. The description will not be repeated here.

Figure 6:
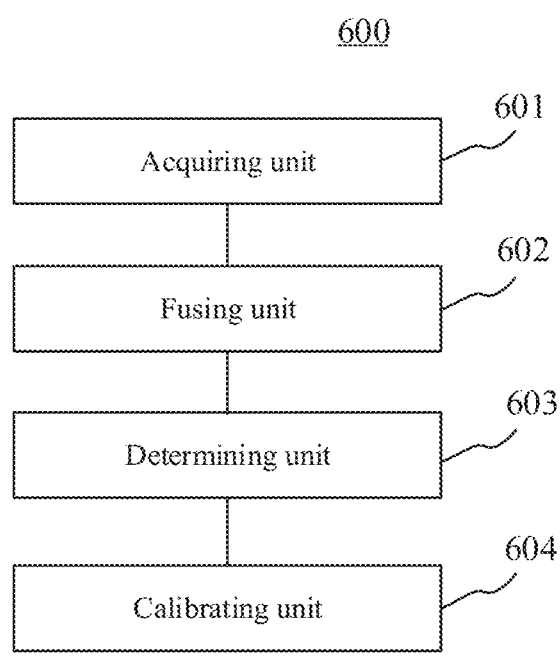
FIG. 6 is a schematic structural diagram of an apparatus for calibrating a camera according to an embodiment of the present disclosure.

With further reference to FIG. 6, as an implementation of the method shown in the above FIG. 3, an embodiment of the present disclosure provides an apparatus for calibrating a camera. An embodiment of the apparatus may correspond to an embodiment of the method shown in FIG. 4. The apparatus may be specifically applied to various electronic devices.

As shown in FIG. 6, the apparatus 600 for calibrating a camera of the present embodiment includes: an acquiring unit 601, a fusing unit 602, a determining unit 603, and a calibrating unit 604.

The acquiring unit 601 is configured to acquire a first image, a second image, and a third image. The first image is an image photographed by a to-be-calibrated camera, the second image is a high-precision map image including a target area indicated by the first image, and the third image is a reflectance image including the target area.

The fusing unit 602 is configured to fuse the second image and the third image to obtain a fused image.

The determining unit 603 is configured to determine a matching point pair based on points selected by a user in the first image and the fused image.

The calibrating unit 604 is configured to calibrate the to-be-calibrated camera based on coordinates of the matching point pair.

In some alternative implementations of the present embodiment, the fusing unit 602 may be further configured to: fuse the second image and the third image based on coordinates of a pixel point in the high-precision map image and coordinates of a pixel point in the reflectance image.

In some alternative implementations of the present embodiment, the determining unit 603 may be further configured to: determine a first point selected by the user in the first image and a second point selected in the fused image after the first point is selected; and use the first point and the second point as a matching point pair.

In some alternative implementations of the present embodiment, the apparatus 600 may further include an adding unit and a storing unit that are not shown in FIG. 6.

The adding unit is configured to add the matching point pair to a preset matching point pair set.

The storing unit is configured to store the matching point pair set locally.

It should be understood that the unit 601 to unit 604 in the apparatus 600 for calibrating a camera correspond to the steps in the method described in FIG. 4 respectively. Therefore, the operations and features described above for the method for calibrating a camera also apply to the apparatus 600 and the units included therein. The description will not be repeated here.

Figure 7:
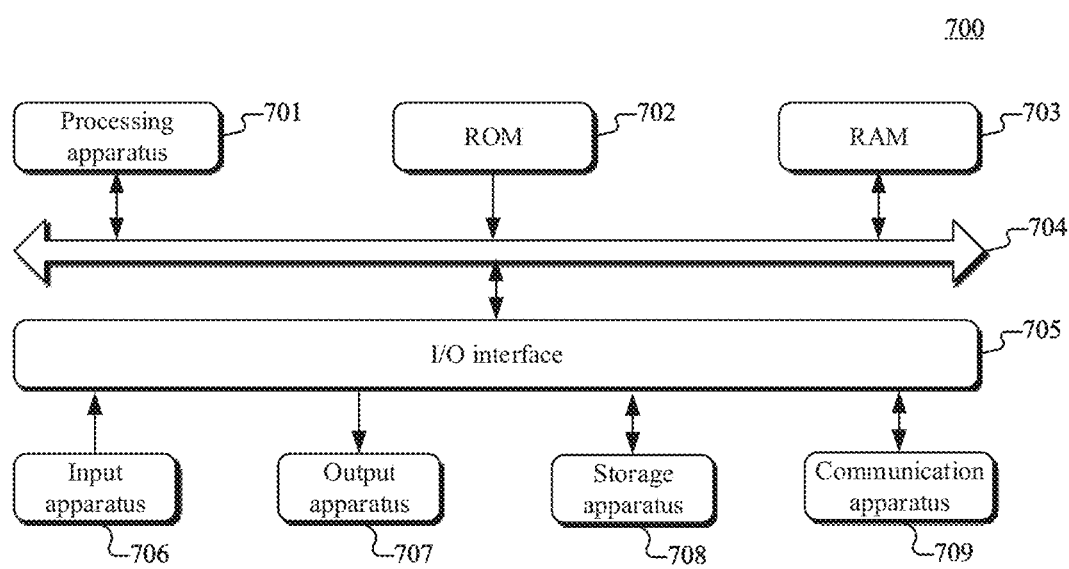
FIG. 7 is a schematic structural diagram of a computer system adapted to implement an electronic device of embodiments of the present disclosure.

Referring to FIG. 7 below, a schematic structural diagram adapted to implement an electronic device (e.g., the server or the terminal device in FIG. 1) 700 of embodiments of the present disclosure is shown. The terminal device in some embodiments of the present disclosure may include, but is not limited to, mobile terminals such as a mobile phone, a notebook computer, and a vehicle terminal (e.g., a vehicle navigation terminal), and fixed terminals such as a desktop computer. The electronic device shown in FIG. 7 is merely an example, and should not limit the functions and scope of use of some embodiments of the present disclosure.

As shown in FIG. 7, the electronic device 700 may include a processing apparatus (e.g., a central processing unit, or a graphics processor) 701, which may execute various appropriate actions and processes in accordance with a program stored in a read-only memory (ROM) 702 or a program loaded into a random access memory (RAM) 703 from a storage apparatus 708. The RAM 703 further stores various programs and data required by operations of the electronic device 700. The processing apparatus 701, the ROM 702, and the RAM 703 are connected to each other through a bus 704. An input/output (I/O) interface 705 is also connected to the bus 704.

In general, the following apparatuses may be connected to the I/O interface 705: an input apparatus 706 including a touch screen, a touch pad, a keyboard, a mouse, a camera, a microphone, an accelerometer, a gyroscope, or the like; an output apparatus 707 including a liquid crystal display device (LCD), a speaker, a vibrator, or the like; a storage apparatus 708 including a magnetic tape, a hard disk, or the like; and a communication apparatus 709. The communication apparatus 709 may allow the electronic device 700 to exchange data with other devices through wireless or wired communication. While FIG. 7 shows the electronic device 700 having various apparatuses, it should be understood that it is not necessary to implement or provide all of the apparatuses shown in the figure. More or fewer apparatuses may be alternatively implemented or provided. Each block shown in FIG. 7 may represent an apparatus, or represent a plurality of apparatuses as required.

In particular, according to some embodiments of the present disclosure, the process described above with reference to the flow chart may be implemented in a computer software program. For example, some embodiments of the present disclosure include a computer program product, which includes a computer program that is tangibly embedded in a computer readable medium. The computer program includes program codes for executing the method as shown in the flow chart. In such an embodiment, the computer program may be downloaded and installed from a network via the communication apparatus 709, or be installed from the storage apparatus 708, or be installed from the ROM 702. The computer program, when executed by the processing apparatus 701, implements the above functions as defined by the method of some embodiments of the present disclosure. It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be included in the above electronic device; or a stand-alone computer readable medium without being assembled into the electronic device. The computer readable medium stores one or more programs. The one or more programs, when executed by the electronic device, cause the electronic device to: display, in response to a first image input operation of a user, a first image selected by the user in a calibration tool, the first image being an image photographed by a to-be-calibrated camera; fuse, in response to a second image input operation of the user, a second image and a third image selected by the user, and display an obtained fused image in the calibration tool, the second image being a high-precision map image including a target area indicated by the first image, and the third image being a reflectance image including the target area; display, in response to a point selection operation of the user on the first image and/or the fused image, a point selected by the user in the first image and/or the fused image; and output coordinates of the selected point. Alternatively, the one or more programs, when executed by the electronic device, cause the electronic device to: acquire a first image, a second image, and a third image, the first image being an image photographed by a to-be-calibrated camera, the second image being a high-precision map image including a target area indicated by the first image, and the third image being a reflectance image including the target area; fuse the second image and the third image to obtain a fused image; determine a matching point pair based on points selected by a user in the first image and the fused image; and calibrate the to-be-calibrated camera based on coordinates of the matching point pair.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in some embodiments of the present disclosure may be implemented by software, or may be implemented by hardware. The described units may also be provided in a processor, for example, described as: a processor including a first displaying unit, a second displaying unit, a point selecting unit, and an outputting unit. Alternatively, a processor includes an acquiring unit, a fusing unit, a determining unit, and a calibrating unit. The names of the units do not constitute a limitation to such units themselves in some cases. For example, the acquiring unit may be further described as "a unit configured to acquire a first image, a second image, and a third image."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for calibrating a camera, comprising:
acquiring a first image, a second image, and a third image, the first image being an image photographed by a to-be-calibrated camera, the second image being a high-precision map image comprising a target area indicated by the first image, and the third image being a reflectance image comprising the target area;
fusing the second image and the third image to obtain a fused image;
determining a matching point pair based on points selected by a user in the first image and the fused image; and
calibrating the to-be-calibrated camera based on coordinates of the matching point pair.

2. The method according to claim 1, wherein the fusing the second image and the third image to obtain a fused image comprises:
fusing the second image and the third image based on coordinates of a pixel point in the high-precision map image and coordinates of a pixel point in the reflectance image.

3. The method according to claim 1, wherein the determining a matching point pair based on points selected by a user in the first image and the fused image comprises:
determining a first point selected by the user in the first image and a second point selected in the fused image after the first point is selected; and
using the first point and the second point as the matching point pair.

4. The method according to claim 3, wherein the method further comprises:
- adding the matching point pair to a preset matching point pair set; and
- storing the matching point pair set locally.

5. An apparatus for calibrating a camera, comprising:
- at least one processor; and
- a memory storing instructions, the instructions when executed by the at least one processor, causing the at least one processor to perform operations, the operations comprising:
- acquiring a first image, a second image, and a third image, the first image being an image photographed by a to-be-calibrated camera, the second image being a high-precision map image comprising a target area indicated by the first image, and the third image being a reflectance image comprising the target area;
- fusing the second image and the third image to obtain a fused image;
- determining a matching point pair based on points selected by a user in the first image and the fused image; and
- calibrating the to-be-calibrated camera based on coordinates of the matching point pair.

6. The apparatus according to claim 5, wherein the fusing the second image and the third image to obtain a fused image comprises:
- fusing the second image and the third image based on coordinates of a pixel point in the high-precision map image and coordinates of a pixel point in the reflectance image.

7. The apparatus according to claim 5, wherein the determining a matching point pair based on points selected by a user in the first image and the fused image comprises:
- determining a first point selected by the user in the first image and a second point selected in the fused image after the first point is selected; and
- using the first point and the second point as the matching point pair.

8. The apparatus according to claim 7, wherein the operations further comprise:
- adding the matching point pair to a preset matching point pair set; and
- storing the matching point pair set locally.

9. A non-transitory computer readable medium, storing a computer program thereon, wherein the computer program, when executed by a processor, causes the processor to implement operations, the operations comprising:
- acquiring a first image, a second image, and a third image, the first image being an image photographed by a to-be-calibrated camera, the second image being a high-precision map image comprising a target area indicated by the first image, and the third image being a reflectance image comprising the target area;
- fusing the second image and the third image to obtain a fused image;
- determining a matching point pair based on points selected by a user in the first image and the fused image; and
- calibrating the to-be-calibrated camera based on coordinates of the matching point pair.

10. The computer readable medium according to claim 9, wherein the fusing the second image and the third image to obtain a fused image comprises:
- fusing the second image and the third image based on coordinates of a pixel point in the high-precision map image and coordinates of a pixel point in the reflectance image.

11. The computer readable medium according to claim 9, wherein the determining a matching point pair based on points selected by a user in the first image and the fused image comprises:
- determining a first point selected by the user in the first image and a second point selected in the fused image after the first point is selected; and
- using the first point and the second point as the matching point pair.

12. The computer readable medium according to claim 11, wherein the operations further comprise:
- adding the matching point pair to a preset matching point pair set; and
- storing the matching point pair set locally.

* * * * *